United States Patent
Kikuchi et al.

(10) Patent No.: US 7,970,584 B2
(45) Date of Patent: Jun. 28, 2011

(54) PERFORMANCE ABNORMALITY ANALYSIS APPARATUS, METHOD, AND PROGRAM, AND ANALYSIS RESULT DISPLAY METHOD FOR PERFORMANCE ABNORMALITY ANALYSIS APPARATUS

(75) Inventors: Shinji Kikuchi, Kawasaki (JP); Ken Yokoyama, Kawasaki (JP); Akira Takeyama, Kawasaki (JP); Koji Ishibashi, Kawasaki (JP); Kenichi Shimazaki, Kawasaki (JP); Lilian Harada, Kawasaki (JP); Nobuhiro Yugami, Kawasaki (JP); Yukiko Seki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 448 days.

(21) Appl. No.: 12/110,616

(22) Filed: Apr. 28, 2008

(65) Prior Publication Data

US 2009/0048807 A1 Feb. 19, 2009

Related U.S. Application Data

(63) Continuation of application No. PCT/JP2005/019974, filed on Oct. 31, 2005.

(51) Int. Cl.
    *G06F 15/00* (2006.01)
(52) U.S. Cl. .................. 702/186; 702/185
(58) Field of Classification Search .......... 702/185, 702/186
    See application file for complete search history.

(56) References Cited

U.S. PATENT DOCUMENTS

| | | | |
|---|---|---|---|
| 6,351,561 B1 | 2/2002 | Iyengar | 382/226 |
| 2004/0199484 A1 | 10/2004 | Smith | 706/52 |
| 2005/0096877 A1 | 5/2005 | Shimazaki | 702/186 |
| 2007/0088528 A1* | 4/2007 | Miller | 702/185 |

FOREIGN PATENT DOCUMENTS

| | | |
|---|---|---|
| JP | 02-267631 | 11/1990 |
| JP | 2-267631 | 11/1990 |
| JP | 08-278901 | 10/1996 |

(Continued)

OTHER PUBLICATIONS

Bandar, Z. et al. *Genetic algorithm based multiple decision tree induction*, 6th International Conference on Neural Information Processing, IEEE Piscataway, NJ, vol. 2, 1999, pp. 429-434.

(Continued)

*Primary Examiner* — Bryan Bui
(74) *Attorney, Agent, or Firm* — Staas & Halsey LLP (57) ABSTRACT

In determining a condition of a case under which the occurrence rate of the performance abnormality is high based on information related to a resource utilization situation acquired in a resource utilization situation acquisition step and an occurrence frequency of a request acquired in a request occurrence frequency acquisition step, and information related to the existence/nonexistence of the performance abnormality determined in a performance abnormality existence/nonexistence determination step, when branching a parent node that represents a situation of a decision tree to two child nodes using the method of decision tree, the decision tree is generated using an evaluation function which performs branching such that most of normal samples which belong to the parent node are contained in the one child node, and most of abnormal values which belong to the parent node are contained in the other child node.

20 Claims, 9 Drawing Sheets

FOREIGN PATENT DOCUMENTS

| | | |
|---|---|---|
| JP | 8-278901 | 10/1996 |
| JP | 9-330224 | 12/1997 |
| JP | 09-330224 | 12/1997 |
| JP | 2002-342182 | 11/2002 |
| JP | 2003-298655 | 10/2003 |
| JP | 2004-252972 | 9/2004 |
| JP | 2005-135130 | 5/2005 |

OTHER PUBLICATIONS

Chen, M. et al., *Failure diagnosis using decision trees*, Proceedings—International Conference on Autonomic Computing, 2004 IEEE Computer Society, 2004, pp. 36-43.

Kikuchi, S. et al., *Performance problem analysis method for web systems using multiple decision trees*, Proceedings of the IEEE International Performance, Computing, and Communications Conference, 2006 Institute of Electrical and Electronics Engineering, vol. 2006, 2006, pp. 415-424.

Extended European Search Report dated Mar. 9, 2009 in corresponding European Application No. 05800458.1 (7 pp).

Ishi, K. *Practical course of data mining for each theme to seize a chance of winning, 8th/application to QC*, Network Computing, vol. 12, No. 10, Oct. 10, 2000, pp. 84-89 (6 pages).

International Search Report dated Dec. 2, 2005 in corresponding PCT Application No. PCT/JP2005/019974 (10 pages).

Ishi, K. *Practical course of data mining for each theme to seize a chance of winning, 8th/application to QC*, Network Computing, vol. 12, No. 10, Oct. 10, 2000, pp. 84-89.

International Preliminary Report on Patentability, mailed May 6, 2008, in corresponding International Application No. PCT/JP2005/019974 (5 pp.).

\* cited by examiner

```
typedef struct {
int time[5]; // Year,Mon,Day,Hour,Min
int request_rates[N];
int resource_consumptions[M];
Boolean flag; // Over threshold?
} SAMPLES;
```

N... Number of normal samples
A... Number of abnomal samples

FIG.7

Table 1. Table form output

| Number of abnorrmal samples | Time | Request (req/min) | Resource utilization rate (Resources consumptions) (%) |
|---|---|---|---|
| 40 | $Day \geq 26$ | | $CPU\ util. \geq 70$ |
| 20 | $Day \geq 26$ | | $CPU\ util. \leq 69$ |
| 30 | $Day \leq 25$ | $*.html \geq 100$ | |
| 10 | $Day \leq 25$ | $*.html \leq 99$ | |

Table 2. Resource related parameters

| Types of Information | Command | Number of Parameters |
|---|---|---|
| CPU utilization rate | mpstat | 6 |
| CPU queue length | sar | 2 |
| Disk read / write | iostat | 10 |
| Free disk space | df | 7 |
| File I/O | sar | 3 |
| Free memory space | sar | 10 |
| Semaph | sar | 2 |
| Network communication | netstat | 5 |
| Page faults | sar | 10 |
| Page in / Page out | vmstat -p | 14 |
| Swap I/O | sar | 5 |
| Swap area size | swap -s | 4 |
| System call | sar | 7 |
| Process table | sar | 11 |
| | total | 96 |

PERFORMANCE ABNORMALITY ANALYSIS APPARATUS, METHOD, AND PROGRAM, AND ANALYSIS RESULT DISPLAY METHOD FOR PERFORMANCE ABNORMALITY ANALYSIS APPARATUS

CROSS-REFERENCE TO RELATED APPLICATIONS

This application is a continuation of International Application No. PCT/JP2005/019974, filed Oct. 31, 2005, the disclosure of which is herein incorporated in its entirety by reference.

BACKGROUND

1. Field

The present invention relates to a performance abnormality analysis apparatus, a performance abnormality analysis method, and a performance abnormality analysis program, and an analysis result display method for the performance abnormality analysis apparatus, which, for example, in an complicated network system such as a plural-layer server system, by analyzing and clarifying the generation pattern of a performance abnormality, assists specifying the cause at an early stage or resolving an abnormality at an early stage with respect to the performance abnormality.

2. Description of the Related Art

Conventionally, several methods to analyze the cause of a performance abnormality of a system have been researched. In the following Non-Patent Document 1, there is employed a method in which a measurement means called an event tracer is embedded in a kernel of a Linux, and the utilization situation of a resource is directly observed, and the analysis for the behavior thereof is performed. This method, which directly collects more detailed data, is significantly effective in an environment such as a benchmark testing of a system.

However, in a system which is being operated, it is significantly difficult to embed a measurement means in a kernel. Furthermore, this means is applied only to an open-source OS.

Furthermore, in the following Non-Patent Document 2, "automated drill down" is suggested as a method for the system performance analysis. This method performs an analysis with the grain size, under which parameters are observed, changed such that hour→minute, subnet→host, and a grain size under which the ratio of the performance abnormality is large is found out.

However, when this method is employed, with respect to parameters which are represented as consecutive amounts such as resource consumption amounts, it is difficult to analyze parameters whose grain size cannot be set up. Accordingly, since parameters which can be used for the analysis are extremely limited, it is difficult to apply this method to the analysis for multiple numerical value parameters, which is the object of the present invention.

As a method for a bottleneck analysis which utilizes a decision tree, in the Non-Patent Document 3, using an open-source data mining tool (Weka 3: Data Mining Software in Java, <http://www.cs.waikato.ac.nz/ml/weka/>), a bottleneck raised in an eBay of an auction site is analyzed. However, in an environment of this method, the number of kinds of parameters to be used for the analysis is only six, which is all discrete information such as the type of request or the host name, and is not numerical value information. So, the upper limit of the number of value to which respective parameters can be set is extremely limited. Then, while the analysis is performed about which apparatus in a system is the cause of a bottleneck, it cannot be seen that under what state (range of value of parameters) of the apparatus a bottleneck occurs.

Furthermore, in this method, a decision tree is generated using an existing method such as the "C4.5" (method which has an algorithm based on the divide and conquer algorithm, and establishes a tree by recursively invoking a function to establish respective nodes, and, from data which establishes the tree, acquires divisional information in the respective nodes to select attributes to be divided) or the "MinEntropy".

Non-Patent Document 1: T. Horikawa, Application of Event Trace Framework for Performance Problem Solutions, IPSJ SIG Technical Report, 2003.

Non-Patent Document 2: D. G. Hart, J. L. Hellerstein, and P. C. Yue, Failure Diagnosis Using Detection Trees Automated Drill Down: An Approach to Automated Problem Isolation for Performance Management, Proc. of the Computer Measurement Group, 1999.

Non-Patent Document 3: M. Chen, A. X. Zheng, J. Lloyd, M. I. Jordan, and E. Brewer, Failure Diagnosis Using Detection Trees, Proc. of International Conference on Automatic Computing, 2004.

SUMMARY

On the other hand, along with the development of the network service in recent years, a high quality in service thereof is being required. For example, there is a case in which, a Service level agreement (SLA) is concluded between a business proprietor and a service provider, and, with respect to the lowering in service quality, a penalty is given to the service provider. Accordingly, the system manager has to overwatch the service quality all the time and exert effort to reduce the performance abnormality.

However, in recent years, the network system typified by the Web system is becoming large-scale as well as complicated. Accordingly, in the above-described conventional technique, there is a problem that it is difficult to figure out the behavior of a system from a wide variety of parameters indicative of the operation situation of apparatuses configuring the system, and analyze the characteristics of a situation in which an abnormality occurs, and then specify the cause of the abnormality.

In view of the above-identified circumstances, it is therefore an object of the present invention to solve the above-described problem, and provide a performance abnormality analysis apparatus, method, and program, and a display method therefor, which can deal with a wide variety of parameters which can be collected by only utilizing a log of a server or a basic command such that they can be easily applied to a system which is actually in operation, and are of high accuracy and of high reliability.

To solve the above-described problem, the present invention provides a performance abnormality analysis program that causes a computer to execute the analysis of the performance abnormality of a system composed of a plurality of computers, the program causing a computer to execute the steps including: a resource utilization situation acquisition step that acquires a resource utilization situation of the system; a request occurrence frequency acquisition step that acquires an occurrence frequency of a request which is transmitted to the system; a processing time acquisition step that acquires a time period required when the system processes the request transmitted to the system; a performance abnormality existence/nonexistence determination step that determines the existence/nonexistence of the performance abnormality; and a condition analysis step that analyzes a condition of a case under which the occurrence rate of the performance abnormality is high based on information related to the resource utilization situation acquired in the resource utilization situation acquisition step and the occurrence frequency of a request acquired in the request occurrence frequency acquisition step, and information related to the existence/nonexistence of the performance abnormality determined in the performance abnormality existence/nonexistence determination step, the condition analysis step generating, when branching a parent node that represents a situation of a decision tree to two child nodes using the method of decision tree, the decision tree using an evaluation function which performs branching such that most of normal samples which belong to the parent node are contained in the one child node, and most of abnormal values which belong to the parent node are contained in the other child node, determining a condition of a case under which the rate of the performance abnormality is high.

According to the performance abnormality analysis program of the present invention, as the evaluation function, the condition analysis step uses an evaluation function that uses, the number $N_0$ of normal samples and the number $A_0$ of abnormal samples which belong to the parent node, and the number of respective samples of any one of groups, or a group of the number $A_1$ of abnormal samples which belong to the one child node and the number $N_2$ of normal samples which belong to the other child node, and a group of the number $N_1$ of normal samples which belong to the one child node and the number $A_2$ of abnormal samples which belong to the other child node.

According to the performance abnormality analysis program of the present invention, as the evaluation function, the condition analysis step uses the product of $A_1/A_0$ and $N_2/N_0$.

According to the performance abnormality analysis program of the present invention, the condition analysis step determines a condition of a case under which the occurrence rate of the performance abnormality is high by, when generating a decision tree, exploratively changing a set of parameters to be used, generating a plurality of decision trees, and selecting a predetermined single decision tree therefrom.

According to the performance abnormality analysis program of the present invention, the program further causes a computer to execute: an analysis result output step that represents a condition of a case under which the occurrence rate of the performance abnormality is high using a set of parameters and threshold values thereof, and outputs the occurrence frequency or occurrence rate of the performance abnormality, and conditions under which the performance abnormality occurs in the table form or in the Venn diagram form.

Furthermore, the present invention provides a performance abnormality analysis method that performs the analysis of the performance abnormality of a system composed of a plurality of computers, the method including: a resource utilization situation acquisition step that acquires a resource utilization situation of the system; a request occurrence frequency acquisition step that acquires an occurrence frequency of a request which is transmitted to the system; a processing time acquisition step that acquires a time period required when the system processes the request transmitted to the system; a performance abnormality existence/nonexistence determination step that determines the existence/nonexistence of the performance abnormality; and a condition analysis step that analyzes a condition of a case under which the occurrence rate of the performance abnormality is high based on information related to the resource utilization situation acquired in the resource utilization situation acquisition step and the occurrence frequency of a request acquired in the request occurrence frequency acquisition step, and information related to the existence/nonexistence of the performance abnormality determined in the performance abnormality existence/nonexistence determination step, the condition analysis step generating, when branching a parent node that represents a situation of a decision tree to two child nodes using the method of decision tree, the decision tree using an evaluation function which performs branching such that most of normal samples which belong to the parent node are contained in the one child node, and most of abnormal values which belong to the parent node are contained in the other child node, determining a condition of a case under which the rate of the performance abnormality is high.

Furthermore, the present invention provides a performance abnormality analysis apparatus that analyzes the performance abnormality of a system composed of a plurality of computers, the apparatus including: a resource utilization situation acquisition unit that acquires a resource utilization situation of the system; a request occurrence frequency acquisition unit that acquires an occurrence frequency of a request which is transmitted to the system; a processing time acquisition unit that acquires a time period required when the system processes the request transmitted to the system; a performance abnormality existence/nonexistence determination unit that determines the existence/nonexistence of the performance abnormality; and a condition analysis unit that analyzes a condition of a case under which the occurrence rate of the performance abnormality is high based on information related to the resource utilization situation acquired by the resource utilization situation acquisition unit and the occurrence frequency of a request acquired by the request occurrence frequency acquisition unit, and information related to the existence/nonexistence of the performance abnormality determined by the performance abnormality existence/nonexistence determination unit, the condition analysis unit generating, when branching a parent node that represents a situation of a decision tree to two child nodes using the method of decision tree, the decision tree using an evaluation function which performs branching such that most of normal samples which belong to the parent node are contained in the one child node, and most of abnormal values which belong to the parent node are contained in the other child node, determining a condition of a case under which the rate of the performance abnormality is high.

Furthermore, the present invention provides an analysis result display method for a performance abnormality analysis apparatus which represents a condition of a case under which the occurrence rate of the performance abnormality is high using a set of parameters and threshold values thereof, and displays the occurrence rate of the performance abnormality and conditions under which the performance abnormality occurs in the Venn diagram form.

According to the analysis result display method for a performance abnormality analysis apparatus, by changing the depiction method in respective regions of the Venn diagram according to the performance abnormality occurrence frequency or number of times of occurrences under situations represented by the respective regions, the difference of the performance abnormality occurrence frequency under different conditions is visually represented.

Furthermore, parameters or threshold values in the output result of analysis can be arbitrarily changed, and the changed result is reflected on a diagram or a table.

DETAILED DESCRIPTION

Hereinafter, the embodiment according to the present invention will be described in detail referring to the accompanying drawings.

[Analysis Target]

In this embodiment, a system being an analysis subject with respect to a performance abnormality is, as an example, a system that is based on the Web, and a system in which plural UNIX servers perform transaction processing in cooperation with each other is to be analyzed. For example, there are an e-commerce system and a mission-critical task system in an enterprise.

Parameters indicative of the service level to be overwatched are response time of the Web transaction, and, in case a response of a transaction, which is noticed by the manager, surpasses a set up threshold value, it is determined that a performance abnormality occurs.

[Approach]

There are various methods which overwatch a system being an analysis subject, and acquire parameters representing the behavior thereof. For example, there are a method in which codes for overwatching are embedded in an OS and a method in which a special apparatus for overwatching is inserted in a network. However, it is often difficult to introduce these methods in an actually operated system.

Figure 1:
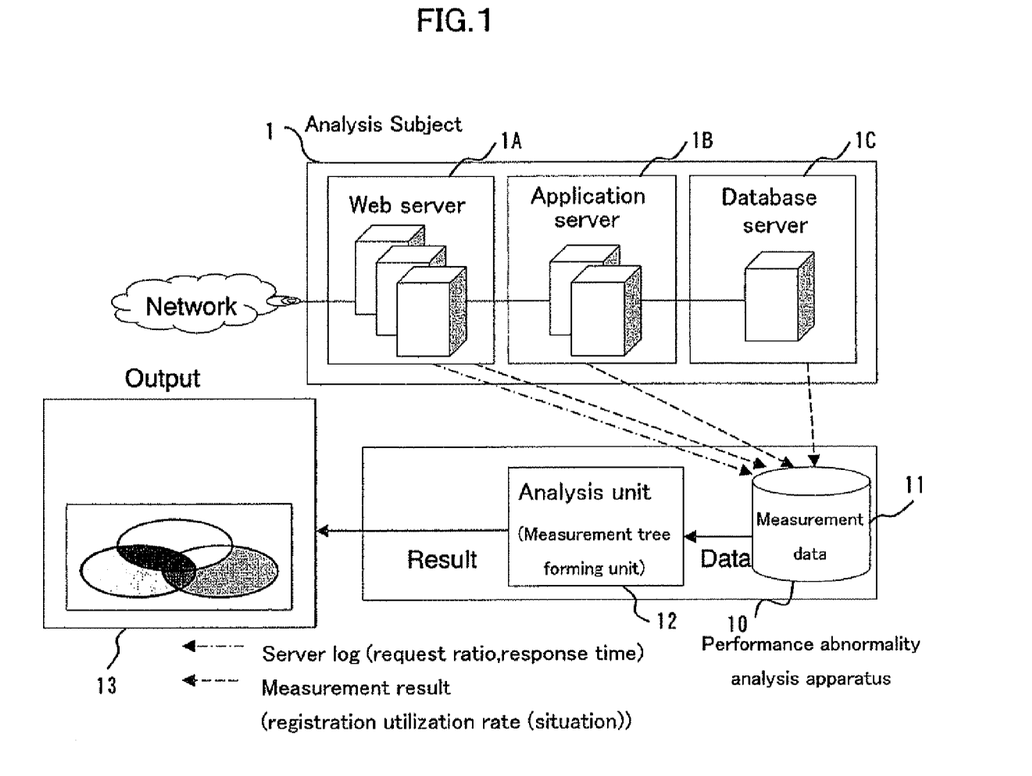
FIG. 1 shows a block diagram indicative of one example of the configuration according to the first embodiment.

In this embodiment, as a method which can be easily implemented, the analysis is performed by utilizing only information which can be acquired from a log of a server or a basic command operation. On the other hand, this method does not prevent the above-described method from being employed. On the basis of the premise, the configuration of a set up present embodiment will be shown in FIG. 1. In FIG. 1, a reference numeral "1" represents an analysis subject, a reference numeral "1A" represents a Web server, a reference numeral "1B" represents an application server, and a reference numeral "1C" represents a database server. A performance abnormality analysis apparatus 10 includes a database 11 that acquires and stores information necessary for the analysis as measurement data, a performance abnormality analysis unit 12 that analyzes the condition of a performance abnormality and determines the performance abnormality, and an analysis result display unit 13 that displays the analysis result.

In the system in this embodiment, the occurrence frequency of transaction and response time being overwatching subjects are acquired from a log of a Web server. In case of a Web server such as the Apache (registered trademark) which is widely diffused (Apache HTTP Server Project, <http://www.apache.org/>), by specifying an option, response time with the "msec" unit can be recorded in a log.

Furthermore, parameters representing the resource utilization situation of respective servers are periodically collected from all the servers in the overwatching subject system by utilizing a command which can be normally utilized such as the sar, mpstat, iostat. These parameters are analyzed using a decision tree, and the request occurrence frequency and the usage rate of resource at the time point when response time surpasses a threshold value are analyzed, and a condition under which a performance abnormality occurs is specified. In this embodiment, as will be described later, the performance abnormality analysis apparatus 10 includes a resource utilization situation acquisition unit, a request occurrence frequency acquisition unit, a processing time acquisition unit, a performance abnormality existence/nonexistence determination unit, and a condition analysis unit of the present invention.

[Analysis Algorithm]

(Decision Tree)

The decision tree (L. Breiman, J. H. Friedman, R. A. Olsen, and C. J. Stone, Classification and Regression Trees, Wadsworth, 1984.) is a classification method which is often used for, in general, the decision-making such as automated control and determination for event. This decision tree is suitable when explaining the classification and the reason of situation analysis as compare with other classification methods such as the cluster analysis. Accordingly, in this embodiment, this method is used to analyze a situation under which a performance abnormality occurs.

(Data Structure)

Figure 2:
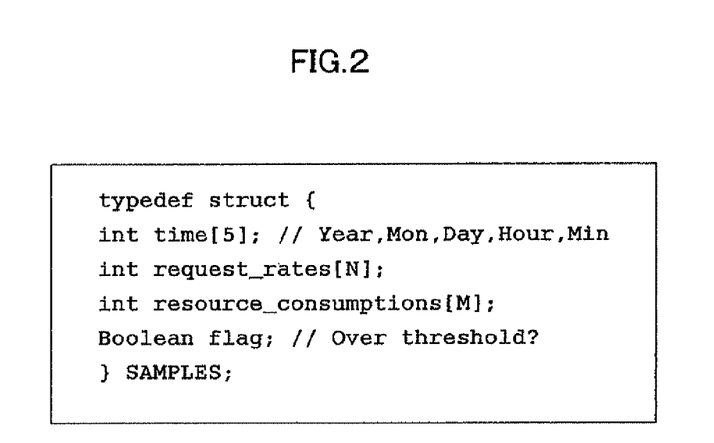
FIG. 2 shows a view indicative of one example of a data structure for analysis which is written in the form of a structure format.

FIG. 2 shows a view in which a data structure to be used for the analysis is written in the form of a structure format. Data is composed of information of four categories, or (1) time and date, (2) request frequency, (3) resource consumption amount, and (4) flag which discriminates normality/abnormality. In the method of the present embodiment, the sampling is performed for respective parameters under time slices with regular intervals, and data corresponding to a single piece of time slice is defined as one sample, which is to be used for the analysis by a decision tree.

While the kind of parameters belonging to the respective categories can be arbitrarily changed by a transaction which is noticed by the manager or parameters which can be acquired from the system, for example, it is assumed that the following information is utilized.

(1) Time and date information: sampling time and date for data

Year, month, day, hour, minute (2) Request frequency: the number of HTTP requests which occur in time slices is counted for each of the following kinds Response code (200, 304, 404, etc)

Extension (.html, .gif, .jsp, .cgi, etc)

Request type (GET or POST)

Request of performance abnormality overwatching subject (URL)

(3) Resource consumption amount: the followings are examples

CPU usage rate (Usr, Sys, I/O wait, total, queue length, etc)

Disk (Reading/writing number of times, R/W wait time, etc)

Memory (free memory, page fault number, etc)

Process (active process number)

(4) Flag attribute: with respect to respective time slices, in case response time of a noticed request in a time slice fulfills a predetermined performance abnormality determination condition, this time slice is determined as a performance abnormal sample, while the response time does not fulfill the condition, this time slice is determined as a normal sample.

The performance abnormality determination condition can contain, for example, cases fulfilling the followings in a time slice. These conditions can be arbitrarily set up.

(1) Surpassing a threshold value by a noticed request occurs at least once.

(2) Surpassing a threshold value by a noticed request occurs by a predetermined number of times or more (for example, five times or more).

(3) Surpassing a threshold value by a noticed request occurs by a predetermined ratio or more (for example, 50% or more of occurrence number of times of a noticed request in a time slice).

(4) Upper long 20% of response time of a noticed request surpasses a threshold value.

(Configuration of Decision Tree)

Figure 3:
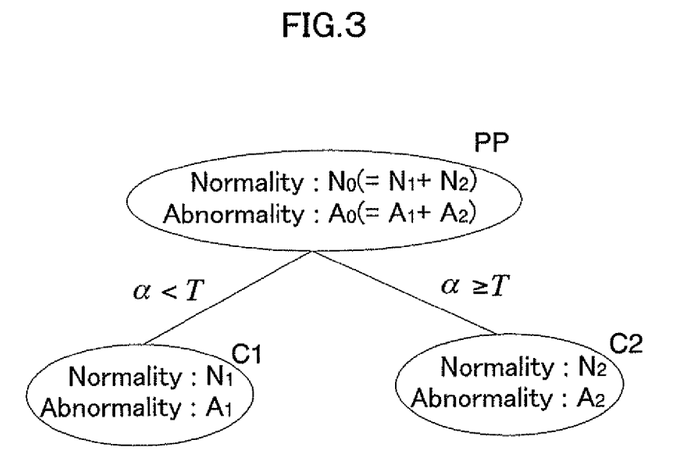
FIG. 3 shows a view indicative of one example of a method of performing the situation analysis using a decision tree.

An example of a method of performing the situation analysis for the above-described defined sample using a decision tree as shown in FIG. 3. FIG. 3 shows a tree composed of one parent node P and two child nodes C1, C2.

The respective nodes represent "situation", and it can be considered that samples conforming to the situation belong to the node. It is assumed that the parent node P contains $N_0$ pieces of normal samples and $A_0$ pieces of abnormal samples. Then, the situation represented by the parent node P is branched to the situation C1 in which a parameter $\alpha$ is less than T ($N_1$ pieces of normal samples and $A_1$ pieces of abnormal samples are contained) and to the situation C2 in which the parameter $\alpha$ is T or more ($N_2$ pieces of normal samples and $A_2$ pieces of abnormal samples are contained).

By recursively repeating this branching at the respective nodes, and segmentalizing the situation, a decision tree is established. Then, of leaves of thus generated decision tree, by listing up branch conditions existing in paths from leaves containing many abnormal samples to the root, conditions under which an abnormality easily occurs are clarified.

In generating a decision tree, it is important to select parameters to be used for the branching and threshold values therefor. In a general decision tree, from attributes of samples contained in leaves of the decision tree, the "representative value" of the attributes which the leaves represent is often determined by the majority vote. Accordingly, the division is performed such that many samples having a single attribute value are contained in leaves of a decision tree preferably, and samples having other attribute values are not contained therein.

For example, in the representative decision tree establishment method ID3, using an evaluation function being an information gain shown in mathematical expressions (1) (2), parameters to be utilized for the branching are selected (S. J. Russell, and P. Norvig, Artificial Intelligence, Prentice-Hall, 1995.).

[Expression 1]

$$\text{Gain} = -p(0) + \sum_{i=1}^{2}\left(\frac{A_i + N_i}{A_0 + N_0} \cdot p(i)\right) \quad (1)$$

$$p(n) = \frac{A_n}{A_n + N_n}\log_2\frac{A_n}{A_n + N_n} + \frac{N_n}{A_n + N_n}\log_2\frac{N_n}{A_n + N_n} \quad (2)$$

However, in the analysis for the occurrence situation of a performance abnormality, which is the object of the present invention, the occurrence probability of a performance abnormality is low, and it can be considered that there exist many cases in which the number of normal samples is much larger than the number of abnormal samples ($N_0 \geqq A_0$). Under this condition, the following mathematical expressions are obtained,

[Expression 2]

$$\frac{A_0}{A_0 + N_0} \approx 0, \quad \frac{N_0}{A_0 + N_0} \approx 1$$

and, undesirably, since the gain becomes significantly small all the time, there is a possibility that a useful result is hard to derive.

Figure 4:
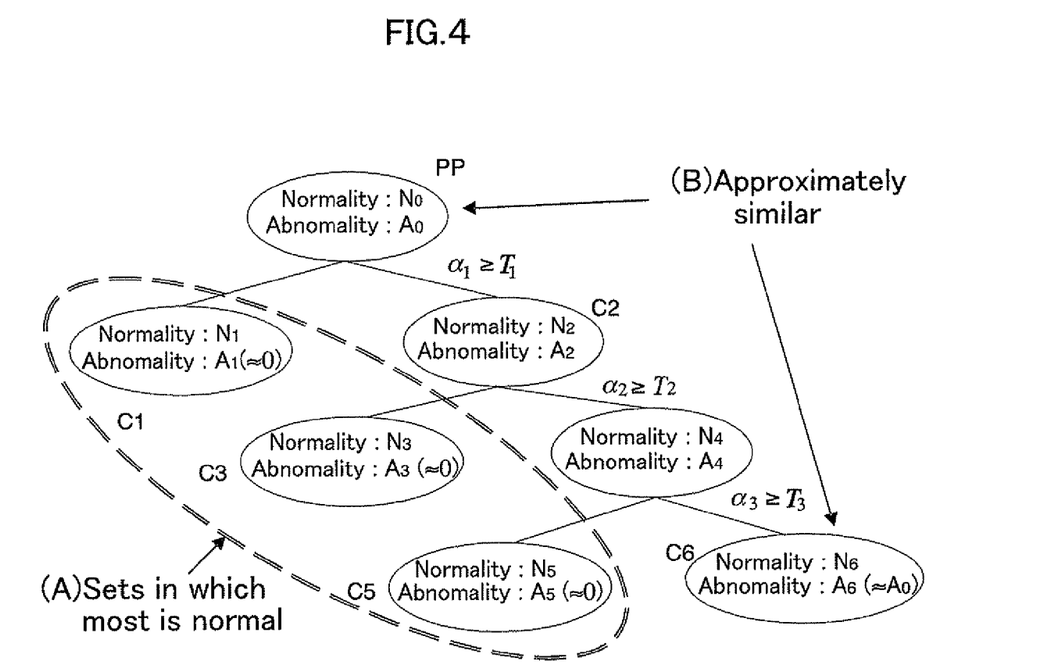
FIG. 4 shows a view indicative of a branch which generates many leaves which scarcely contain abnormal samples.

Furthermore, in this branch method, since it becomes easy to extract conditions under which only normal samples, which are large in number, occur, as shown in FIG. 4, the possibility that a branch that generates many leaves which scarcely contain abnormal samples appears is high. Even if the branching is performed many times, between the node (P) before the branching and a node (C4) after the branching, the situation (contained abnormal samples) represented thereby is scarcely changed.

Nevertheless, the number of condition mathematical expressions necessary to explain the situation is undesirably becoming large. In the "analysis for a situation under which the abnormality occurs", which is the object of the present invention, since it is desirable that the analysis result is simple (the number of condition mathematical expressions necessary to explain the situation is small), this branch method is not suitable for the embodiment.

To solve the above-described problem, the present embodiment devises and employs an evaluation function SSF (Situation Separating Function) that classifies the situation into "a situation in which occurrence ratio of abnormal values is large" and "a situation in which occurrence ratio of normal values is large". Selecting a group of parameters and threshold values which maximizes the evaluation function, branching a decision tree is performed.

[Expression 3]

$$SSF = \frac{A_1}{A_0} \cdot \frac{N_2}{N_0} \quad (3)$$

As shown in FIG. 3, when dividing the one parent node PP ($N_0$ pieces of normal samples and $A_0$ pieces of abnormal samples) to the two child nodes, in case most of the $A_0$ abnormal samples contained in the parent node are contained in the one child node C1 (A1 pieces of abnormal samples) and most of the $N_0$ normal samples contained in the parent node are contained in the other child node C2 ($N_2$ pieces of normal samples), the value of the evaluation function SSF becomes large.

When this method is employed, not depending on a proportion ($A_0/N_0$) of the number of normal samples and the number of abnormal samples, these samples can be suitably separated to "a situation under which an abnormality easily occurs "comparatively" " and "a situation under which an abnormality scarcely occurs". In this embodiment, as an evaluation function, a group of the number $N_0$ of normal samples and the number $A_0$ of abnormal samples which belong to the parent node, the number $A_1$ of abnormal samples which belong to the one child node, and the number $N_2$ of normal samples which belong to the other child node is used. On the other hand, instead of this, an evaluation function which brings about the same effect can be employed by using a group of the number $N_0$ of normal samples and the number $A_0$ of abnormal samples which belong to the parent node, the number $N_1$ of normal samples which belong to the one child node, and the number $A_2$ of abnormal samples which belong to the other child node.

In this embodiment, using the above-described evaluation function, branching a situation is recursively performed so as to establish a decision tree. On the other hand, a threshold value is provided so that the situation is not minutely branched too much by a decision tree, and, when a ratio $Ax/A_0$ of the number $Az$ of abnormal samples which belong to a node $Cz$ and the number $A_0$ of all the abnormal samples becomes lower than the threshold value, the node is set to the end.

(Parameter Selection)

A decision tree algorithm extracts a parameter considered to be suitable for the branching one by one from among many parameters, and branches a situation to establish a decision tree. On the other hand, like a case of the performance abnormality analysis for a system, which is the object of the present invention, in case the number of utilizable parameters is significantly large, or there are many parameters which are not independent, there is also raised a situation in which the most suitable parameter cannot be selected, and a decision tree that suitably represents a situation cannot be acquired.

Figure 5:
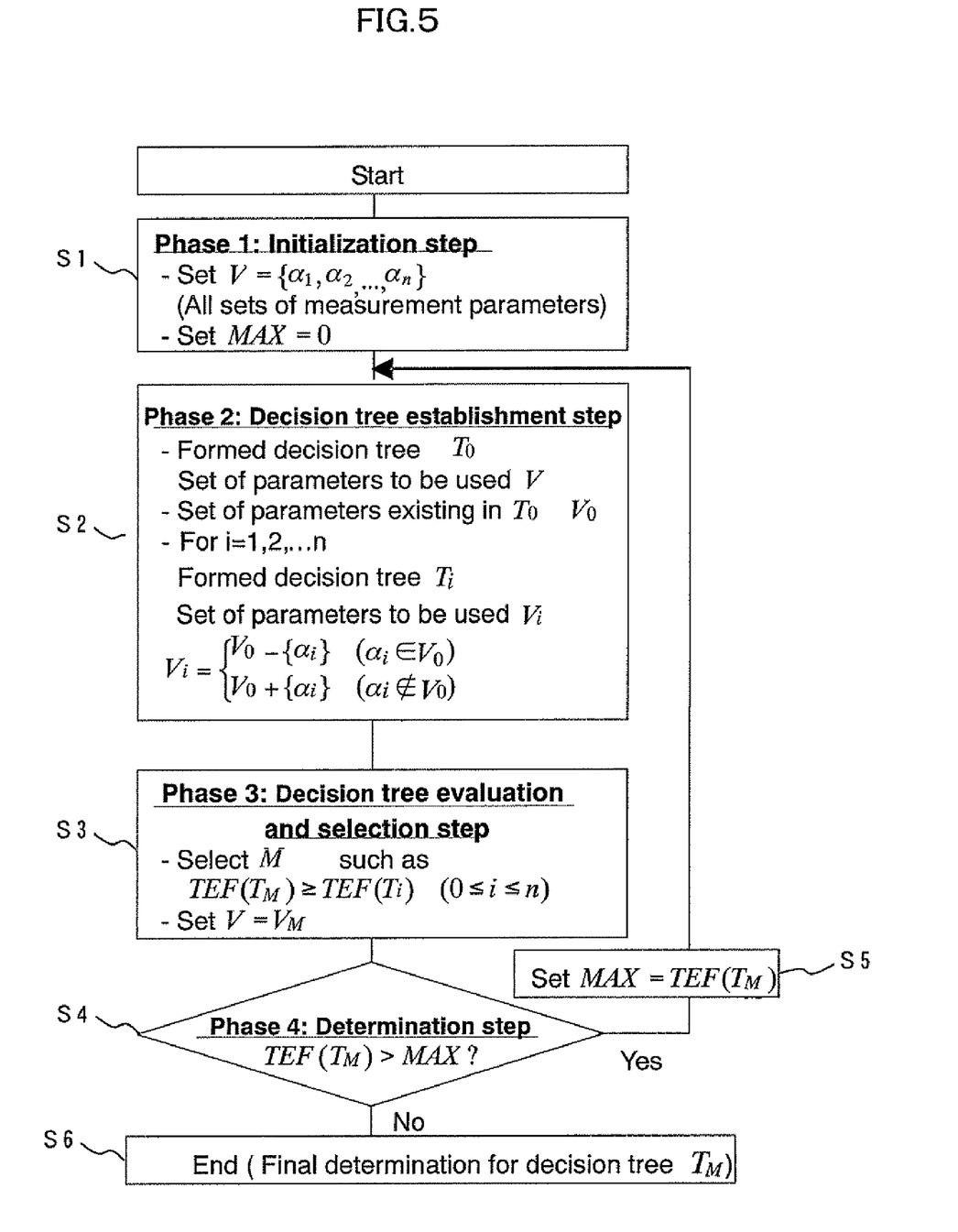
FIG. 5 shows a flow chart of condition analysis steps.

To solve this problem, in this embodiment, in the condition analysis, with parameters to be used in generating a decision tree selected and changed exploratively, a plurality of decision trees are generated, and the best result is selected therefrom. A flow chart of an algorithm for the condition analysis in a condition analysis unit of the present invention is shown in FIG. 5. In this algorithm, parameters are selected in the following procedure.

(Phase 1: Initialization)

When there are "n" pieces of usable parameters as parameters, and the set thereof is $[\alpha_1, \alpha_2, \ldots, \alpha_n]$, it is set up that $V=[\alpha_1, \alpha_2, \ldots, \alpha_n]$. Furthermore, it is set up that a parameter MAX which represents the maximum value of an evaluation function is "0" (step S1).

(Phase 2: Decision Tree Establishment)

A decision tree $T_0$ is established using the set V of the parameters (step S2). At this time, all the parameters in the set V are not necessarily used to generate the decision tree. Of the set V, it is set up that a set of parameters which are actually used to establish the decision tree $T_0$ is $V_0$. Then, as stated below, it is set up that a set which is obtained by adding the parameter $\alpha_i$ to the $V_0$, or subtracting the parameter $\alpha_i$ from the $V_0$ is $V_i$.

[Expression 4]

$$V_i = \begin{cases} V_0 - \{\alpha_i\} & (\alpha_i \in V_0) \\ V_0 + \{\alpha_i\} & (\alpha_i \notin V_0) \end{cases} \quad (4)$$

Utilizing the above-described $V_i$ ($1 \leq i \leq n$), "n" pieces of decision trees $T_i$ ($1 \leq i \leq n$) are established.

(Phase 3: Decision Tree Evaluation and Selection)

In this phase, from among (n+1) pieces of decision trees $T_0$, $T_1, \ldots, T_n$, which are established in Phase 2, the most suitable decision tree is selected (step S3). As a function to evaluate the suitableness of a decision tree, in general, the value of "False positive rate", "False negative rate", or "F-Measure" which is a compositive function thereof is used. However, as described above, in case the number of normal samples is significantly larger than the number of abnormal samples, the number of normal samples is larger than the number of abnormal samples in all the leaves, and there is a case in which all the results are "False negative". Accordingly, these evaluation functions are not suitable for an analysis subject to which this embodiment is applied.

Accordingly, in this embodiment, using the following unique evaluation function Tree Evaluation Function (TEF), the suitableness of a decision tree is determined.

[Expression 5]

$$TEF(T) = \sum_{j}^{\frac{A_j}{A} \geq t} \frac{A_j}{A} \cdot \frac{(N - N_j)}{N} \quad (5)$$

where

T: decision tree

N: the number of all the normal samples

A: the number of all the abnormal samples

T: threshold value $L_j$: leaf node of the decision tree T $A_j$: the number of abnormal samples belonging to the leaf $L_j$ $N_j$: the number of normal samples belonging to the leaf $L_j$ The way of considering for this function is basically similar to that of the function SSF which is used for the branching, and, when the proportion of abnormal samples belonging to the leaf node $L_j$ of the decision tree with respect to all the abnormal samples ($A_j/A$) is large, and the proportion of normal samples belonging to the leaf node $L_j$ with respect to all the normal samples ($N_j/N$) is small, the evaluation function TEF becomes large. Furthermore, with respect to a leaf in which the number of abnormal samples is extremely small, it is considered that explaining the abnormality occurrence situation is meaningless, and, in order to remove the influence by the leaf, setting up a constant threshold value, the above-described evaluation function TEF is evaluated using only leaves containing abnormal samples whose proportion is more than the threshold value.

Then, the decision trees $T_0, T_1, \ldots, T_n$ are evaluated using the evaluation function TEF, and M that fulfills $TEF(T_M) \geq TEF(T_M) \geq TEF(T_i)$ ($0 \leq i \leq n$) is derived, and it is set up that $V=V_M$.

(Phase 4: Determination)

In this phase, it is investigated whether or not the value of the TEF becomes maximum (step S4). The $TEF(T_M)$ acquired in phase 3 is compared with the maximum value MAX of the TEF in the previous loop, and, in case of $TEF(T_M) > MAX$, substitution of $MAX=TEF(T_M)$ is performed (step S5), and the loop is repeated again from Phase 2. In case of $TEF(T_M)=$ MAX, it is determined that the value of the $TEF(T_M)$ gets to the maximum value, and the loop is ended, and the $T_M$ is employed as the finally acquired decision tree (step S6).

(Output)

Using a decision tree, while it becomes possible to specify a situation under which a performance abnormality easily occurs, when the size of a decision tree becomes large, and the number of nodes increases, it becomes significantly difficult to interpret the analysis result of a decision tree by only taking a look at the decision tree. Actually, it can be considered that there are many system managers who have never seen a decision tree. In this embodiment, so as to make a manager figure out a situation more viscerally, a decision tree is not output directly, and the analysis result of the decision tree is output in a comprehensible format using a table form and a Venn diagram form.

(Table Form)

Figure 6:
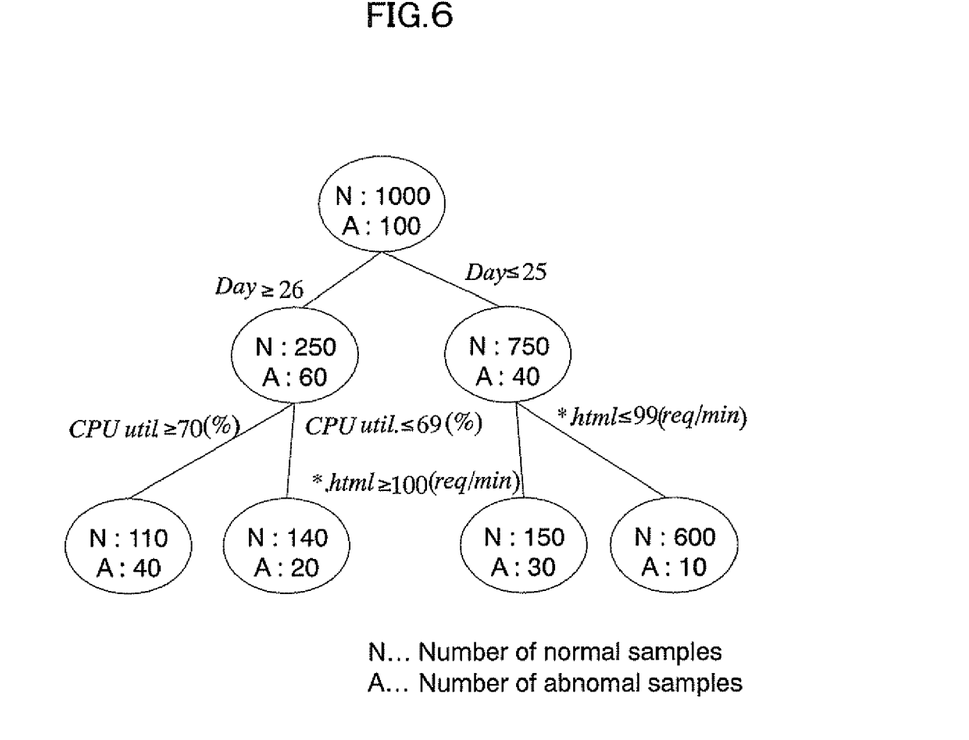
FIG. 6 shows a view indicative of one example of a decision tree.
Figure 7:
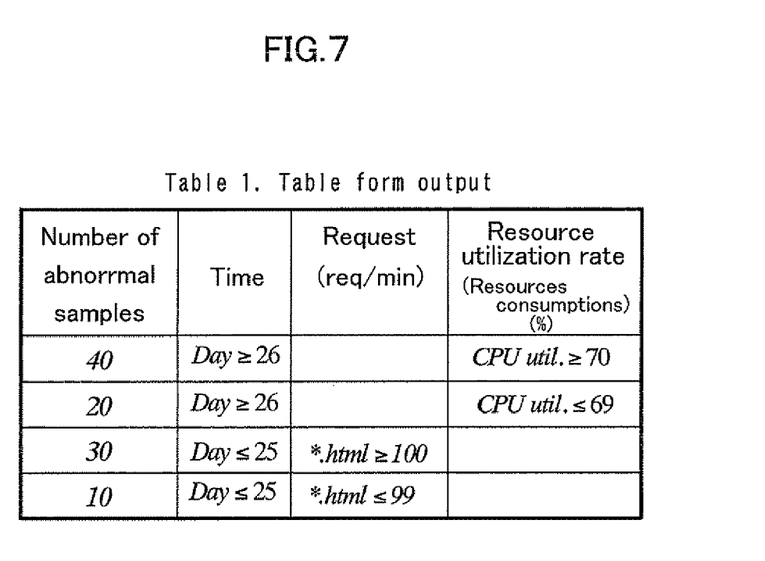
FIG. 7 shows a view indicative of the decision tree shown in FIG. 6 which is represented in the table form.

So as to convert the analysis result of a decision tree to a table form, with respect to leaves of a decision tree representing a situation under which abnormal samples are contained, condition mathematical expressions appearing in respective paths from the root to these leaves are extracted. Then, the condition mathematical expressions are displayed in the table form by arranging the expressions in three categories, or time and date, request frequency, and resource consumption amount. As an example, FIG. 6 shows a decision tree, and FIG. 7 shows the decision tree which is represented in the table form.

(Venn Diagram Form)

In a Venn diagram form, in areas configured by three condition mathematical expressions which are largely related with the abnormal state, and AND/OR thereof, the number of all the samples, the number of abnormal samples, and the ratio thereof corresponding to the respective areas are displayed.

Using the Venn diagram, of conditions represented in the table form, it becomes possible to figure out which condition is important viscerally. Furthermore, it also becomes possible to figure out the relation between conditions instantly (for example, whether or not an abnormality occurs at the time of "condition A and condition B", or whether or not an abnormality occurs at the time of "condition A or condition B".

The three condition mathematical expressions used to generate the Venn diagram evaluate the evaluation function SSF when dividing all the samples using the respective condition mathematical expressions with respect to all the condition mathematical expressions existing in the decision tree, and, of the condition mathematical expressions, three of the expressions whose SSF is large are used in the Venn diagram. Furthermore, in the respective areas in the Venn diagram, a case in which the abnormality occurrence rate is high is darkly displayed in color, which can display a point to be noticed remarkably.

Figure 8:
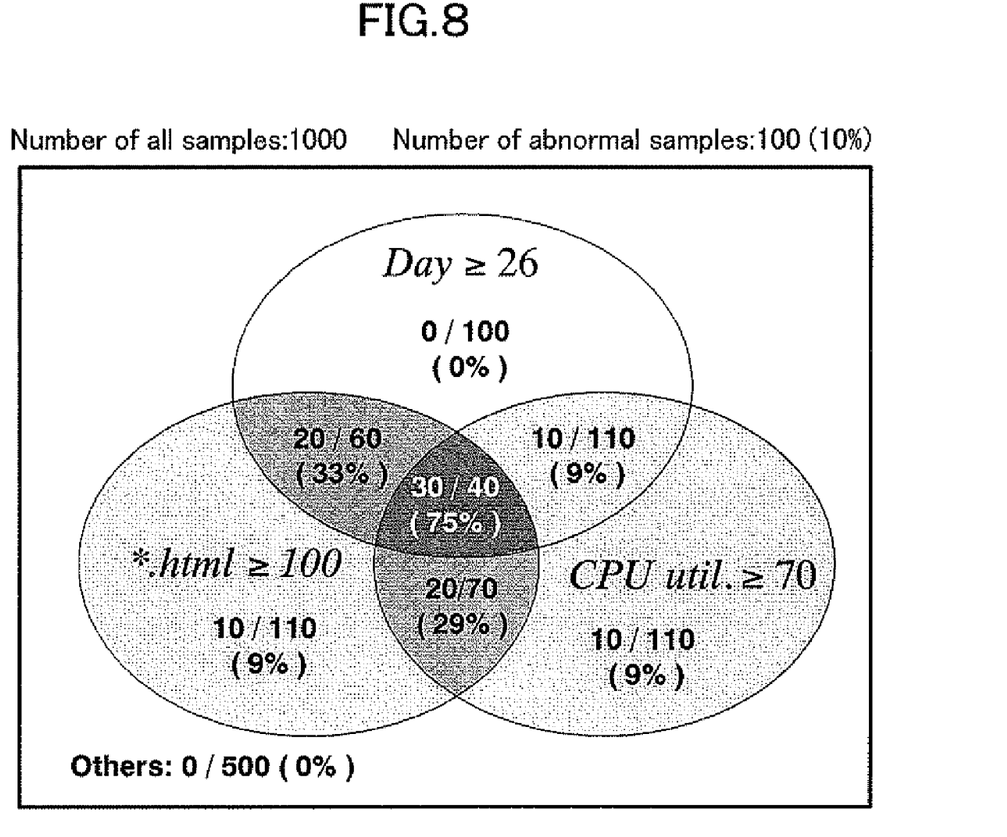
FIG. 8 shows a view indicative of the decision tree shown in FIG. 6 which is represented in the Venn diagram form.

An example in which the decision tree shown in FIG. 6 is represented in the Venn diagram form is shown in FIG. 8. From the drawing, it can be seen that a situation under which an abnormality occurs most easily is the case in which three conditions, or (1) the day is 26 or later, (2) the request with respect to *.html is 100 req/sec or more, and (3) the CPU usage rate is 70% or more, concurrently occur.

Figure 9:
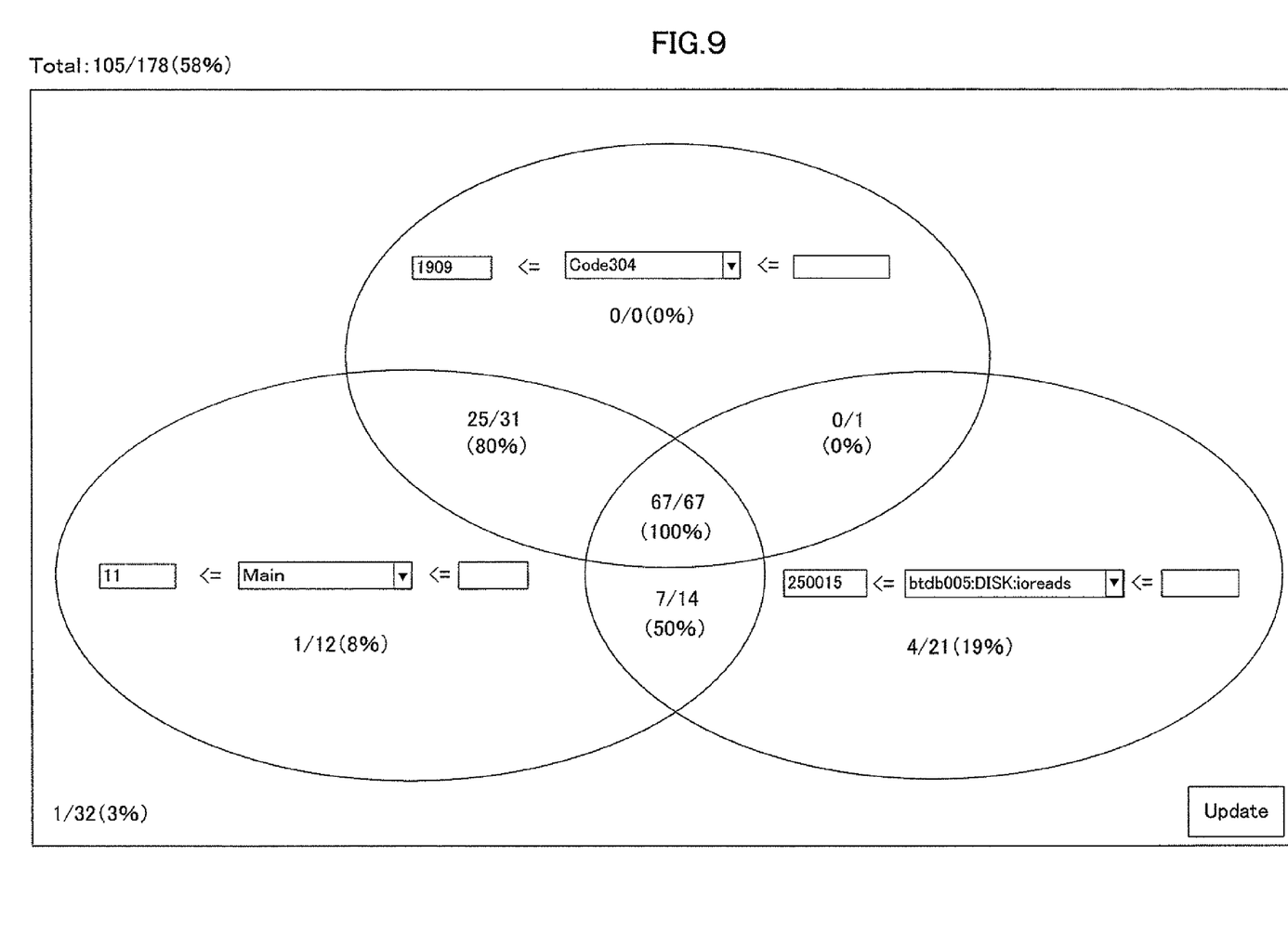
FIG. 9 shows a view indicative of a Venn diagram interface.

In this embodiment, not only the result is output using a Venn diagram, but also the more adaptable situation analysis becomes possible, by making the Venn diagram itself have the function as an interface, and the analysis result is treated interactively to enable a new analysis. A screenshot which is obtained by forming a Venn diagram interface using Java Applet is shown in FIG. 9.

In this prototype, the kind of parameters of the condition mathematical expressions in the respective areas in the Venn diagram can be changed by the pull-down menu, or by directly inputting the threshold value of parameters to a text box. Then, when pressing an Update button arranged at the lower right of the Venn diagram, along the condition mathematical expressions changed by the user, values and the darkness in color of the areas in the Venn diagram are changed.

[Investigation]
(Condition)

This embodiment is applied to an environment which is actually utilized by many users, and the analysis and evaluation are performed.

Figure 10:
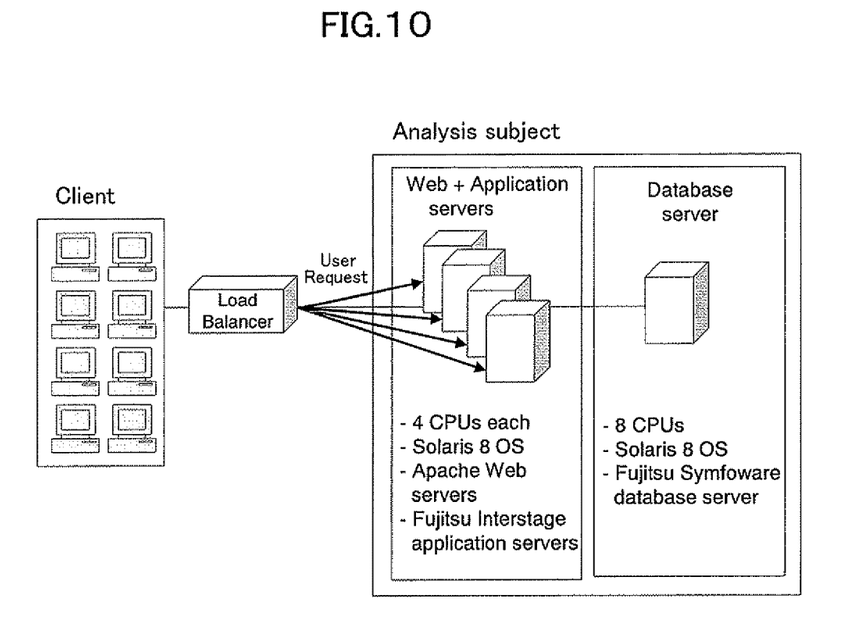
FIG. 10 shows a block diagram indicative of the configuration of an analysis subject system.

FIG. 10 shows a schematic view of an analysis subject system. The analysis subject system is a Web system that includes four Web-servers/application-servers and a DB server. To the Web-servers/application-servers, in which four CPU's are mounted respectively, user requests are evenly distributed from a load balancer.

The DB server has eight CPU's. The OS of all the servers is Solaris8 (registered trademark), and Apache is utilized for the Web servers, Fujitsu Interstage (Fujitsu Interstage, <http://interstage.fujitsu.com/>) is utilized for the application servers, and Fujitsu Symfoware (Fujitsu Symfoware, <http://www.fuiitsu.com/services/software/symfoware/>) is utilized for the DB server.

Of requests transmitted to the above-described system from the user, one request (URL) whose number of times of occurrences and response time are large comparatively is selected, and thus selected request is set to an analysis subject request in this embodiment. The response time of the request is collected from a log of the Apache Web server.

Furthermore, the user requests are classified into 17 kinds (types) according to the response code or extension, and the occurrence frequency of the requests which belong to the respective types is counted from a Web log.

Figure 11:
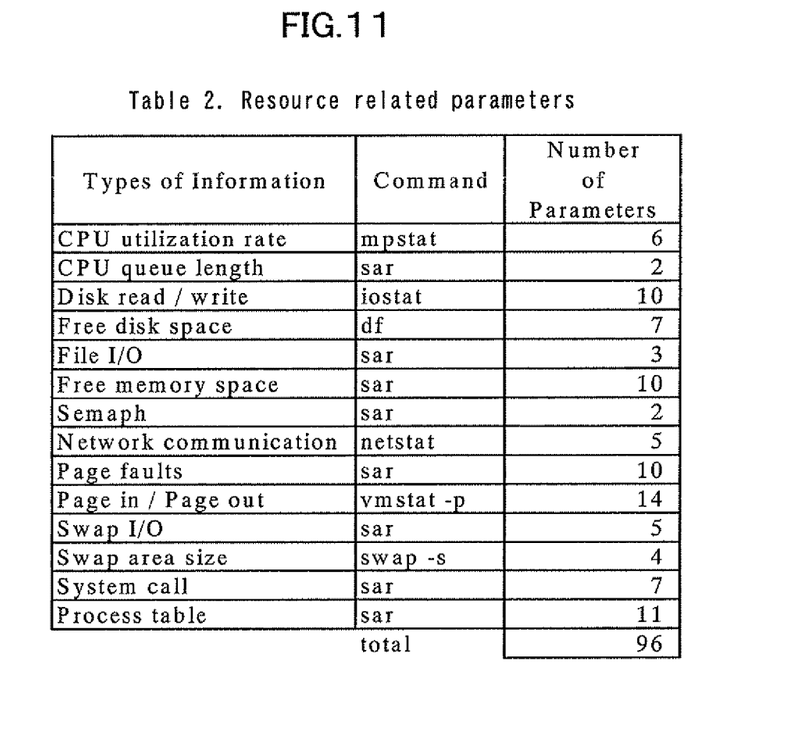
FIG. 11 shows a view indicative of information related to resource utilization situations.

Moreover, information related to total 96 kinds of resource utilization situations shown in FIG. 11 is acquired from five servers using standard Unix commands respectively. This information is sampled for 26 days with intervals of ten minutes, and five kinds of time and date information (year, month, day, hour, minute) is added thereto, and total 502 kinds of parameters are prepared as parameters for the performance abnormality analysis.

In order to analyze the above-described data, the abnormality analysis apparatus in this embodiment is mounted onto a Red Hat Enterprise Linux (Red Hat Enterprise Linux, <http://www.redhat.com/software/rhel/>) using the C language. As has been described above, only part of the Venn diagram interface is mounted using Java applet. The CPU of a PC used for the analysis is Pentium (registered trademark) 4, 3E Ghz, and the memory is 1 Gbyte.

In order to confirm the effect of the evaluation function and parameter selection method of the present invention, the analysis is performed with the condition changed as stated below.

(Pattern 1: Gain)

For comparison, in the algorithm which has been explained in this embodiment, the analysis is performed using Information Gain instead of the evaluation function SSF.

(Pattern 2: in Case of not Selecting Parameters)

While the SSF is used as an evaluation function to generate a decision tree, only a decision tree in a case of using all the parameters is employed, and a loop to search parameters is not performed.

(Pattern 3: Present Embodiment)

The approach itself in the embodiment according to the present invention is used. The evaluation function SSF is utilized, and searching parameters is performed.

Furthermore, so as to evaluate the analysis result under respective conditions, the following three indexes are set up.

(Accuracy)

A formed decision tree is evaluated using the evaluation function TEF (mathematical expression 5). When the value is large, it can be evaluated that normal samples and abnormal samples are suitably separated.

(Simplicity)

In a decision tree, with respect to leaves of the decision tree which contains 10% or more abnormal samples of all the abnormal samples, the number of parameters appearing in paths from the root to the leaves is counted, and is averaged over the entire decision tree. When the value is small, it can be evaluated that the situation is analyzed with a small number of parameters, which is desirable.
(Calculation Time Period)

The time period required to generate a decision tree and the number of times of loops in selecting parameters are counted, and the value is evaluated. A small calculation time period is desirable.
[Result]
(Accuracy)

Figure 12:
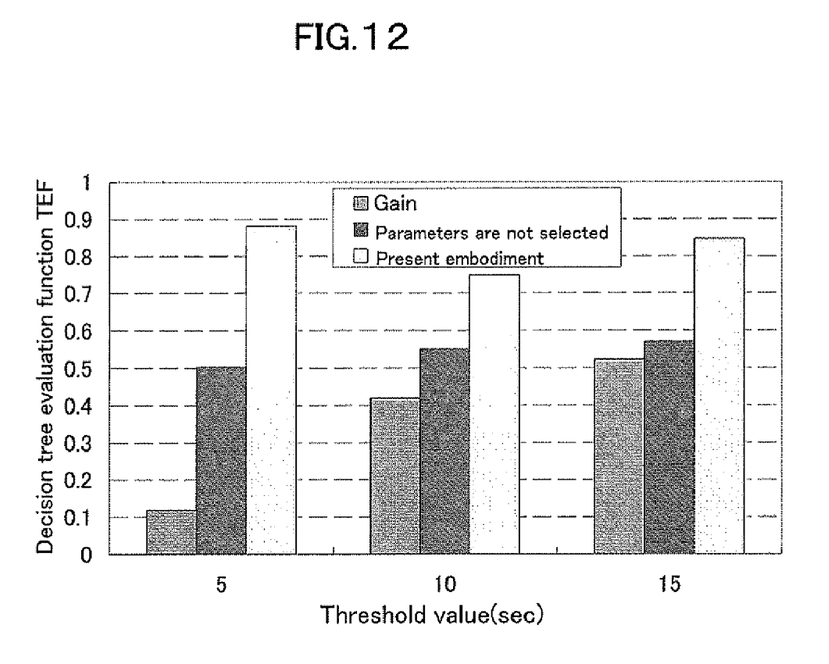
FIG. 12 shows a view indicative of values of an evaluation function (TEF) under respective experimental conditions.

In FIG. 12, values of the evaluation function TEF under respective experimental conditions are shown. As shown in FIG. 12, as compared with a case in which a gain is used when generating a decision tree, or a case in which searching parameters is not performed, the algorithm in this embodiment represents a high TEF value. Accordingly, the evaluation function and parameter selection method in the present embodiment significantly contribute to the accuracy improvement in analysis.
(Simplicity)

Figure 13:
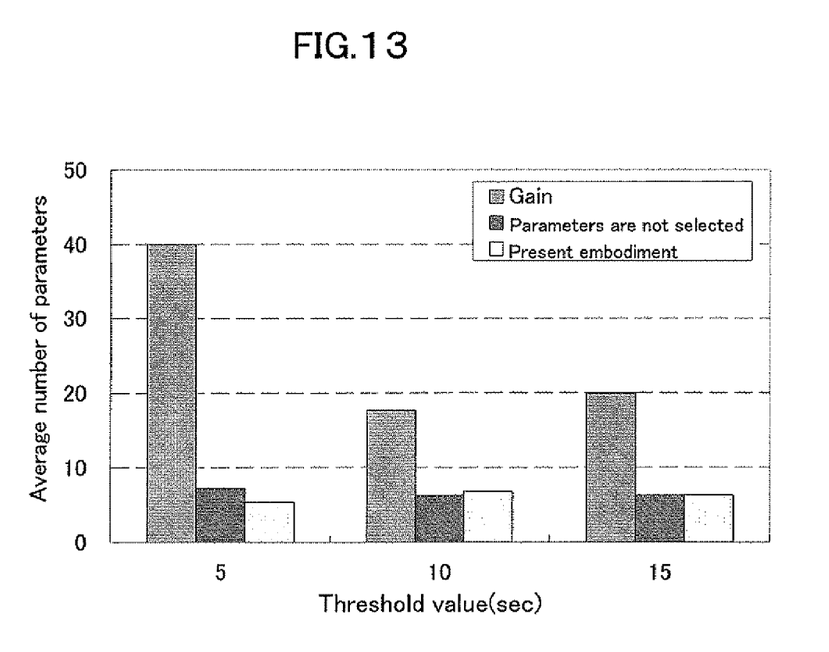
FIG. 13 shows a view indicative of the average numbers of parameters necessary in explaining individual abnormal states in a decision tree which is generated under the experimental conditions shown in FIG. 12.

In FIG. 13, the average number of pieces of parameters necessary in explaining individual abnormal states in a decision tree that is generated under respective conditions are shown. As shown in FIG. 13, as compared with a case in which a gain is used as an evaluation function, the number of pieces of parameters necessary for the explanation is small in a case in which the SSF is utilized. Accordingly, it can be considered that utilizing the evaluation function SSF contributes to simplifying the description of the situation.
(Calculation Time Period)

Figure 14:
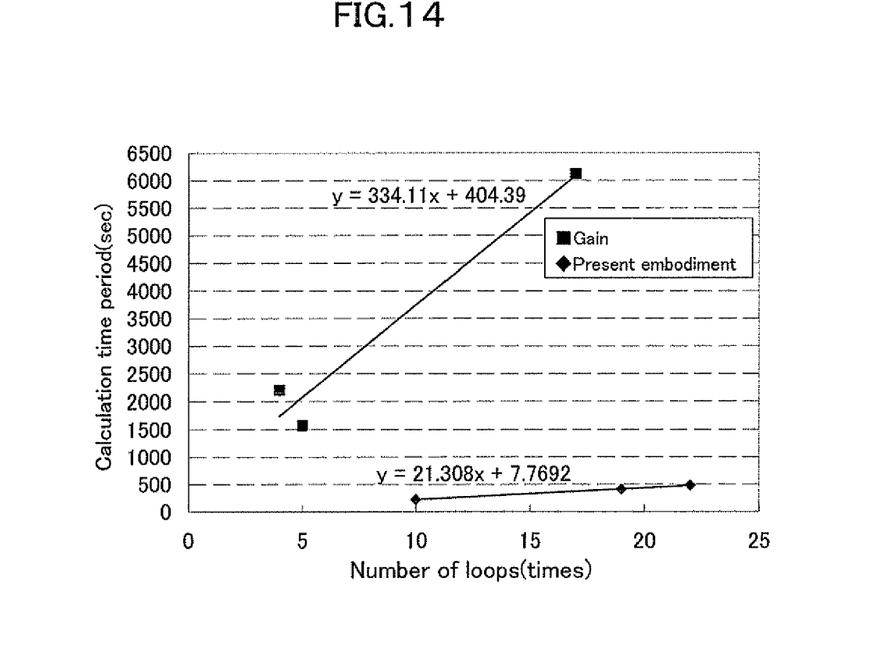
FIG. 14 shows a view indicative of the relationship between time period and the number of times of loop to search parameters in a pattern 1 (gain) and pattern 3 (present embodiment)

In FIG. 14, the relationship between the calculation time period and the number of times of loops to search parameters in an experimental pattern 1 (gain) and pattern 3 (present embodiment) is shown. As shown in FIG. 14, it can be seen that, as compared with a case in which a gain is used, while the number of times of loops which is required before the result converges is large, the time period required to generate a decision tree is significantly short in a case in which the SSF is used. Furthermore, the average calculation time period with respect to one loop is 334.11 seconds in case of a gain, while the average calculation time period is 21.308 seconds in case of the SSF, which is approximately $1/15$. It can be considered that the reason is, since time is required in calculating a log necessary to calculate a gain, and the size of a generated decision tree becomes large, that the time period required to generate a single decision tree is elongated. Accordingly, employing the evaluation function SSF contributes not only to the accuracy and simplicity in explanation but also to reduction in calculation time period.
(Venn Diagram Output)

Figure 15:
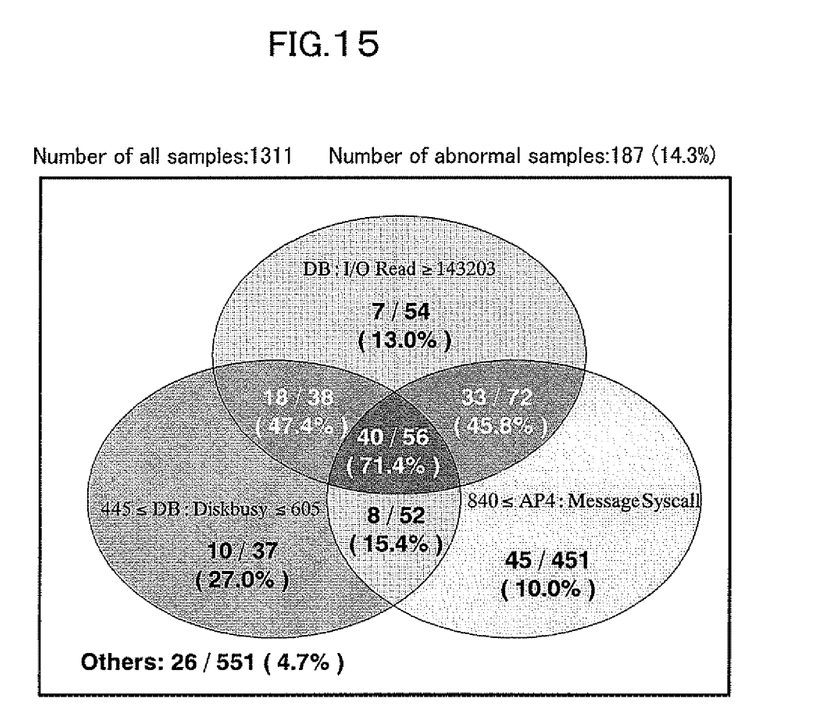
FIG. 15 shows a view indicative of an output result in the Venn diagram form when the value of an evaluation function (FFS) in the present embodiment becomes largest.

Of the above-described experiments, an output result in the Venn diagram form when the value of the evaluation function TEF is the largest value (Pattern 3 (present embodiment) and threshold value is five seconds) is shown in FIG. 15 as an example. In FIG. 15, the Venn diagram is configured by three conditions, or a condition that the number of times of I/O read of a DB (database) server is 143203 times per ten minutes, a condition that the total Disk busy time period of a DB server is not less than 445 seconds as well as not more than 605 seconds per ten minutes (since there are plural Disks, there may be a case in which the total is 600 seconds per ten minutes or more), and a condition that the number of times of issuance of a system call associated with an inter-process communication message of the fourth application server is 840 times per ten minutes.

When taking a look at the Venn diagram, the abnormality occurrence rate under a situation corresponding to any of two conditions related to the DB server largely surpasses the average abnormality occurrence rate (14.3%) in all the samples in most cases. Accordingly, it can be considered that the cause of the performance abnormality in the system is the concentration of disk accesses to a database server. So, by improving the disk access method in a database server application, or by utilizing a distributed database server, it can be considered that the concentration of disk accesses is prevented, and most part of the performance abnormality can be resolved.

According to the above-described embodiment, the following effects are brought about.

(1) In a grand-scale system that outputs a wide variety of parameters, it becomes possible to instantly figure out under which parameter and what value thereof, a performance abnormality easily occurs, which can significantly reduce time and cost required to improve the performance of a system.

(2) Furthermore, utilizing the method of a decision tree, by separating situations at the time of observation to situations under which the performance abnormality occurrence rate is high and situations under which the performance abnormality occurrence rate is low, and determining conditions of a case under which the performance abnormality occurrence rate is high, or, when branching a parent node that represents a situation in a decision tree to two child nodes, by generating a decision tree using an evaluation function that performs branching such that most of normal values which belong to the parent node are contained in the one child node, and most of abnormal values which belong to the parent node are contained in the other child node, and determining conditions of a case under which the performance abnormality occurrence rate is high, it becomes possible to separate situations under which the abnormality easily occurs and normal situations using a smaller number of condition mathematical expressions, which makes it possible to explain situations under which the abnormality easily occurs using a smaller number of conditions.

(3) When generating a decision tree, by generating a plurality of decision trees with a set of parameters to be used exploratively changed, and selecting the most suitable single decision tree therefrom, conditions of a case under which the performance abnormality occurrence rate is high are determined, which makes it possible to obtain an appropriate analysis result.

(4) By representing conditions of a case under which the performance abnormality occurrence rate is high using a set of parameters and threshold values thereof, and outputting the occurrence frequency or occurrence rate of the performance abnormality, and conditions under which the performance abnormality occurs in the table form or in the Venn diagram form, as compared with the case of outputting a decision tree itself, it becomes possible to figure out conditions under which the performance abnormality easily occurs viscerally.

(5) By changing the depiction method (color, pattern, etc.) in respective regions of the Venn diagram according to the performance abnormality occurrence frequency or number of times of occurrences under situations represented by the respective regions, it becomes possible to figure out the difference of the performance abnormality occurrence frequency and rate under different conditions viscerally.

(6) Including a means to arbitrarily change parameters or threshold values in the output result of the analysis, and a means to reflect the changed result on a diagram or a table, it becomes possible to arbitrarily change conditions obtained as a result of the analysis, and easily confirm the performance abnormality occurrence rate and occurrence frequency under the changed conditions.

On the other hand, in the embodiment according to the present invention, a program that causes a computer to execute the performance abnormality analysis and display method therefor can be provided as a performance abnormality analysis program. Being stored in a recording medium whose data can be read out by a computer, the above-described program can be executed by a computer configuring the performance abnormality analysis apparatus. As a recording medium whose data can be read out by the computer, there are an internal storage that is internally mounted to a computer, or a ROM, a RAM, etc., a portable storage medium, or a CD-ROM, a flexible disk, a DVD disk, a magnet-optical disk, an IC card, etc., a database that retains computer programs, other computers and their databases, and a transmission medium on a line.

INDUSTRIAL APPLICABILITY

As has been described above, the present invention can provide a performance abnormality analysis apparatus, method, and program, and a display method therefor, which can deal with a wide variety of parameters which can be collected by only utilizing a log of a server or a basic command such that they can be easily applied to a system which is actually in operation, and are of high accuracy and of high reliability.

What is claimed is:

1. A non-transitory computer-readable medium having stored therein a performance abnormality analysis program that causes a computer to execute an operation including an analysis of the performance abnormality of a system composed of a plurality of computers, the operation comprising:

a resource utilization situation acquisition step that acquires a resource utilization situation of the system;

a request occurrence frequency acquisition step that acquires an occurrence frequency of a request which is transmitted to the system;

a processing time acquisition step that acquires a time period required when the system processes the request transmitted to the system;

a performance abnormality existence/nonexistence determination step that determines the existence/nonexistence of the performance abnormality; and a condition analysis step that analyzes a condition of a case under which the occurrence rate of the performance abnormality is high based on information related to the resource utilization situation acquired in the resource utilization situation acquisition step and the occurrence frequency of a request acquired in the request occurrence frequency acquisition step, and information related to the existence/nonexistence of the performance abnormality determined in the performance abnormality existence/nonexistence determination step, the condition analysis step generating, when branching a parent node that represents a situation of a decision tree to two child nodes using the method of decision tree, the decision tree using an evaluation function which performs branching such that most of normal samples which belong to the parent node are contained in the one child node, and most of abnormal values which belong to the parent node are contained in the other child node, determining a condition of a case under which the rate of the performance abnormality is high.

2. The computer-readable medium according to claim 1, wherein as the evaluation function, the condition analysis step uses an evaluation function that uses, the number $N_0$ of normal samples and the number $A_0$ of abnormal samples which belong to the parent node, and the number of respective samples of any one of groups, or a group of the number $A_1$ of abnormal samples which belong to the one child node and the number $N_2$ of normal samples which belong to the other child node, and a group of the number $N_1$ of normal samples which belong to the one child node and the number $A_2$ of abnormal samples which belong to the other child node.

3. The computer-readable medium according to claim 2, wherein as the evaluation function, the condition analysis step uses the product of $A_1/A_0$ and $N_2/N_0$.

4. The computer-readable medium according to claim 1, wherein the condition analysis step determines a condition of a case under which the occurrence rate of the performance abnormality is high by, when generating a decision tree, exploratively changing a set of parameters to be used, generating a plurality of decision trees, and selecting a predetermined single decision tree therefrom.

5. The computer-readable medium according to claim 1, the program further causing a computer to execute:

an analysis result output step that represents a condition of a case under which the occurrence rate of the performance abnormality is high using a set of parameters and threshold values thereof, and outputs the occurrence frequency or occurrence rate of the performance abnormality, and conditions under which the performance abnormality occurs in the table form or in the Venn diagram form.

6. A performance abnormality analysis method that performs the analysis of the performance abnormality of a system composed of a plurality of computers, the method comprising:

a resource utilization situation acquisition step that acquires a resource utilization situation of the system;

a request occurrence frequency acquisition step that acquires an occurrence frequency of a request which is transmitted to the system;

a processing time acquisition step that acquires a time period required when the system processes the request transmitted to the system;

a performance abnormality existence/nonexistence determination step that determines the existence/nonexistence of the performance abnormality; and a condition analysis step that analyzes a condition of a case under which the occurrence rate of the performance abnormality is high based on information related to the resource utilization situation acquired in the resource utilization situation acquisition step and the occurrence frequency of a request acquired in the request occurrence frequency acquisition step, and information related to the existence/nonexistence of the performance abnormality determined in the performance abnormality existence/nonexistence determination step, the condition analysis step generating, when branching a parent node that represents a situation of a decision tree to two child nodes using the method of decision tree, the decision tree using an evaluation function which performs branching such that most of normal samples which belong to the parent node are contained in the one child node, and most of abnormal values which belong to the parent node are contained in the other child node, determining a condition of a case under which the rate of the performance abnormality is high.

7. The performance abnormality analysis method according to claim 6, wherein as the evaluation function, the condition analysis step uses an evaluation function that uses,
the number $N_0$ of normal samples and the number $A_0$ of abnormal samples which belong to the parent node, and
the number of respective samples of any one of groups, or a group of the number $A_1$ of abnormal samples which belong to the one child node and the number $N_2$ of normal samples which belong to the other child node, and a group of the number $N_1$ of normal samples which belong to the one child node and the number $A_2$ of abnormal samples which belong to the other child node.

8. The performance abnormality analysis method according to claim 7, wherein as the evaluation function, the condition analysis step uses the product of $A_1/A_0$ and $N_2/N_0$.

9. The performance abnormality analysis method according to claim 6, wherein the condition analysis step determines a condition of a case under which the occurrence rate of the performance abnormality is high by, when generating a decision tree, exploratively changing a set of parameters to be used, generating a plurality of decision trees, and selecting a predetermined single decision tree therefrom.

10. The performance abnormality analysis method according to claim 6, the method further comprising:
an analysis result output step that represents a condition of a case under which the occurrence rate of the performance abnormality is high using a set of parameters and threshold values thereof, and outputs the occurrence frequency or occurrence rate of the performance abnormality, and conditions under which the performance abnormality occurs in the table form or in the Venn diagram form.

11. A performance abnormality analysis apparatus that analyzes the performance abnormality of a system composed of a plurality of computers, the apparatus comprising:
a resource utilization situation acquisition unit that acquires a resource utilization situation of the system;
a request occurrence frequency acquisition unit that acquires an occurrence frequency of a request which is transmitted to the system;
a processing time acquisition unit that acquires a time period required when the system processes the request transmitted to the system;
a performance abnormality existence/nonexistence determination unit that determines the existence/nonexistence of the performance abnormality; and
a condition analysis unit that analyzes a condition of a case under which the occurrence rate of the performance abnormality is high based on information related to the resource utilization situation acquired by the resource utilization situation acquisition unit and the occurrence frequency of a request acquired by the request occurrence frequency acquisition unit, and information related to the existence/nonexistence of the performance abnormality determined by the performance abnormality existence/nonexistence determination unit, the condition analysis unit generating, when branching a parent node that represents a situation of a decision tree to two child nodes using the method of decision tree, the decision tree using an evaluation function which performs branching such that most of normal samples which belong to the parent node are contained in the one child node, and most of abnormal values which belong to the parent node are contained in the other child node, determining a condition of a case under which the rate of the performance abnormality is high.

12. The performance abnormality analysis apparatus according to claim 11, wherein as the evaluation function, the condition analysis unit uses an evaluation function that uses,
the number $N_0$ of normal samples and the number $A_0$ of abnormal samples which belong to the parent node, and
the number of respective samples of any one of groups, or a group of the number $A_1$ of abnormal samples which belong to the one child node and the number $N_2$ of normal samples which belong to the other child node, and a group of the number $N_1$ of normal samples which belong to the one child node and the number $A_2$ of abnormal samples which belong to the other child node.

13. The performance abnormality analysis apparatus according to claim 12, wherein as the evaluation function, the condition analysis unit uses the product of $A_1/A_0$ and $N_2/N_0$.

14. The performance abnormality analysis apparatus according to claim 11, wherein the condition analysis unit determines a condition of a case under which the occurrence rate of the performance abnormality is high by, when generating a decision tree, exploratively changing a set of parameters to be used, generating a plurality of decision trees, and selecting a predetermined single decision tree therefrom.

15. The performance abnormality analysis apparatus according to claim 11, the apparatus further comprising:
an analysis result output unit that represents a condition of a case under which the occurrence rate of the performance abnormality is high using a set of parameters and threshold values thereof, and outputs the occurrence frequency or occurrence rate of the performance abnormality, and conditions under which the performance abnormality occurs in the table form or in the Venn diagram form.

16. The performance abnormality analysis apparatus according to claim 15, wherein by changing the depiction method in respective regions of the Venn diagram according to the performance abnormality occurrence frequency or number of times of occurrences under situations represented by the respective regions, the analysis result output unit visually represents the difference of the performance abnormality occurrence frequency under different conditions.

17. The performance abnormality analysis apparatus according to claim 15, wherein the analysis result output unit includes a means to arbitrarily change parameters or threshold values in the output result of analysis, and a means to reflect the changed result on a diagram or a table.

18. The performance abnormality analysis apparatus according to claim 11, wherein an analysis result display is provided which represents the occurrence rate of the performance abnormality using a set of parameters and threshold values thereof, and displays the occurrence rate of the performance abnormality and conditions under which the performance abnormality occurs in the Venn diagram form.

19. The performance abnormality analysis apparatus according to claim 18, wherein by changing the depiction method in respective regions of the Venn diagram according to the performance abnormality occurrence frequency or number of times of occurrences under situations represented by the respective regions, the difference of the performance abnormality occurrence frequency under different conditions is visually represented.

20. The performance abnormality analysis apparatus according to claim 18, wherein parameters or threshold values in the output result of analysis can be arbitrarily changed, and the changed result is reflected on a diagram or a table.

* * * * *